Sept. 14, 1926.
J. B. SANBORN
1,599,924
MOLDED HANDLE AND THE LIKE
Filed June 4, 1923
2 Sheets-Sheet 1
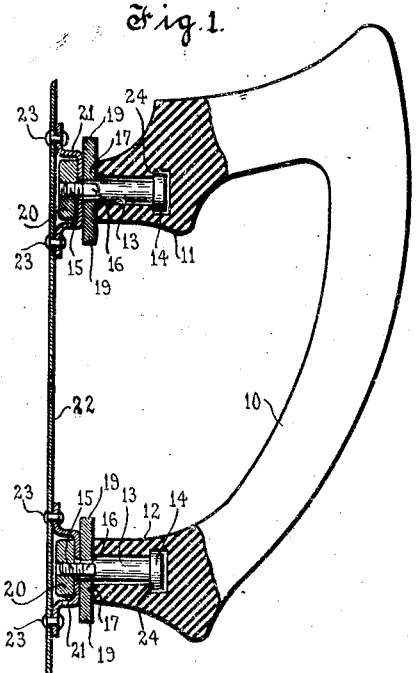
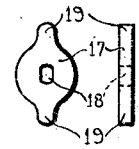
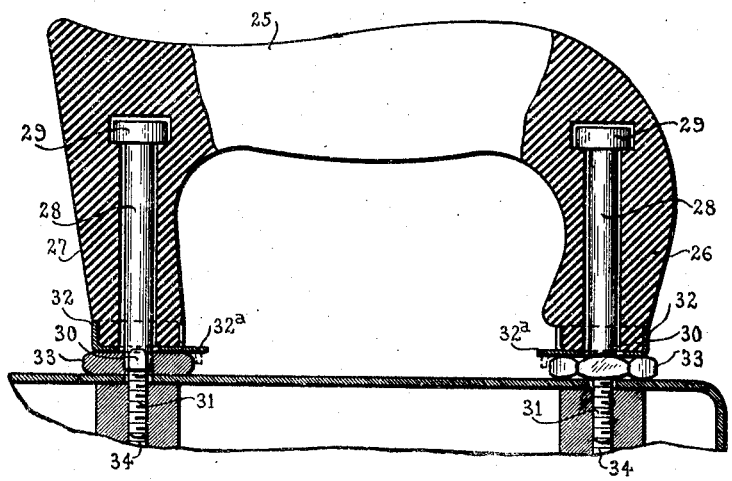
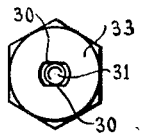
INVENTOR
John B. Sanborn
BY
Frank H. Hubbard
ATTORNEY Sept. 14, 1926.

J. B. SANBORN 1,599,924

MOLDED HANDLE AND THE LIKE

Filed June 4. 1923

INVENTOR
John B. Sanborn
BY
Frank H Hubbard
ATTORNEY

Patented Sept. 14, 1926.

1,599,924

UNITED STATES PATENT OFFICE.

JOHN B. SANBORN, OF EVANSTON, ILLINOIS.

MOLDED HANDLE AND THE LIKE.

Application filed June 4, 1923. Serial No. 643,225.

This invention relates to molded handles and the like and to a method of forming the same.

An object of the invention is to provide a molded handle or the like having one or more rotatable inserts molded therein by an improved method, such inserts serving for attaching or other purposes.

Another object of the invention is to provide a molded handle having attaching elements embedded therein in a manner preserving unbroken the desired contour of the handle.

Another object is to provide a handle having means for attaching the same to an article in a simple and efficient manner without the use of tools.

Another object is to provide a handle having means embedded therein for attaching the same to articles having standard fittings.

Another object is to provide a novel method of forming a molded handle or the like whereby the attaching or other inserts thereof are permitted a limited lateral play therein.

Other objects and advantages will be apparent in the course of the following description.

In the accompanying drawing wherein are illustrated certain of the embodiments which the invention may assume in practice, Figure 1 is a vertical sectional view of one form of handle and attaching means embodying my invention, portions thereof being shown in elevation;

Fig. 2 illustrates in plan and side elevation the type of wrench shown in Fig. 1;

Fig. 3 is a view similar to Fig. 1 of a slightly modified form of handle;

Fig. 4 is a plan view of certain elements of the device shown in Fig. 3;

Figure 5:
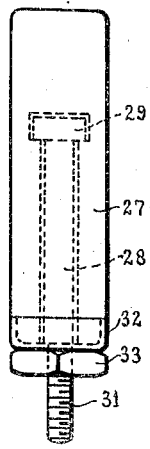
Fig. 5 is an end elevation of the handle shown in Fig. 3.

Referring to Fig. 1 of the drawing the same illustrates a percolator or other hollow-ware article handle and attaching means therefor. The molded handle 10 is substantially U-shaped and embedded in each arm 11 and 12 thereof and freely rotatable with respect thereto is a member 13 having a head portion 14 and a reduced screw threaded portion 15 extending outwardly beyond the material of the handle. The members 13 which are of circular cross section are each provided with cut-away or flattened portions 16 adapted to be engaged by wrench members 17 having correspondingly shaped openings 18 therethrough, as clearly shown in Fig. 2. The wrench members 17 are provided with ears or projections 19 to facilitate turning of the same. In attaching the handle to an article the wrench members 17 are positioned upon the projecting portions of the attaching members 13 and the screw threaded portions 15 are brought into engagement with polygonal nuts 20, the latter being held against rotation by means of surrounding cap members 21 which engage the sides of the nuts, the cap members 21 being fastened to the percolator or other article 22 by any suitable means, such as rivets 23. By rotating the wrench members 17 the attaching members 13 are also caused to rotate, which feeds the screw threaded portions 15 into the nuts 20 and thereby draws the head portions 14 against the shoulders 24 to clamp the parts together.

An important and desirable feature resides in the provision of means whereby the fastening members 13 may be embedded in the handle while enabling the same to be freely rotatable with respect thereto. This is accomplished by coating the fastening members 13 with a suitable low melting point alloy, after which the handle is molded with the coated members embedded therein. After molding the handle the low melting point alloy is melted out, which provides a space or clearance between the material and the fastening members whereby the latter are free to rotate with respect to the handle. If the fastening members were embedded in the molded material in the ordinary manner, the same would be tightly held against rotation, as is well known to those skilled in the art.

Fig. 3 illustrates my invention as applied to a handle for an electric iron or the like, wherein the handle 25 of the desired shape has embedded in the arms 26 and 27 thereof the fastening members 28. These fastening members are provided with head portions 29, cut-away or flattened portions 30, and reduced screw threaded portions 31, as described in connection with Fig. 1. It will be noted, however, that the fastening members 28 in Fig. 2 are of much larger dimensions than the fastening members 13 in Fig. 1 and extend through the major portion of the length of arms 26 and 27 and thus tend to reinforce the material forming the handle. Attached to the ends of the arms 26 and 27 are metal ferrules or caps 32 which bear against the wrench members 33. The screw threaded portions 31 are adapted to be moved into correspondingly threaded recesses 34 to thereby hold the handle in position. The wrench members 33 in this instance are of polygonal shape to adapt the same for engagement by a suitable tool for rotating the same, although it is to be understood that the periphery of the wrench members may be milled or notched or of any other suitable shape to permit the same to be readily engaged by hand or a tool to turn the same. The wrench 33 as shown in Fig. 4 is provided with an opening shaped to cooperate with the flattened portions 30 of the fastening members 28. It will also be understood that the fastening members 28 are coated with a low melting point alloy prior to embedding the same in the handle member and the alloy melted out after molding, as described in connection with Fig. 1.

In practice the wrench members 17 (Fig. 1) and 33 (Fig. 3) will be frictionally held against accidental reverse movement when the handles have been attached to the articles. If desired, however, any suitable locking means may be provided, such as a spring clip attached to the handle and engaging the periphery of the wrench, or a portion 32ª of the ferrule or cap 32 may be bent downwardly to engage the wrench when the handle has been attached, as shown in dotted lines in Fig. 3.

Figure 6:
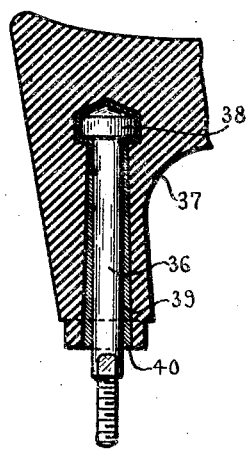
Fig. 6 is a vertical sectional view of a portion of a handle illustrating one manner of spacing the attaching element from the material of the handle.
Figure 7:
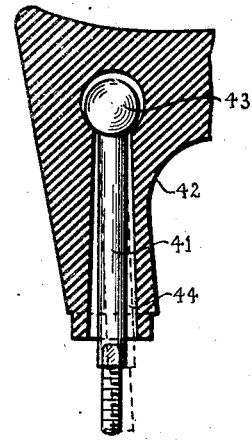
Fig. 7 is a similar view showing a ball and socket connection between the attaching element and the handle, and the means for permitting relative angular adjustment therebetween.

Fig. 6 illustrates another arrangement for embedding a fastening member 36 within a molded handle 37, the member 36 having a conical head member 38 and being otherwise as shown and described in connection with Figs. 3 and 5. The member 36 in this instance is, however, provided with a low melting point alloy coating 39 of varying thickness longitudinally of the member 36. The coating is thickest at the lower portion 40 thereof and the thickness gradually decreases toward the head 38 of the fastening member. This arrangement is desirable since it has been found that the alloy can be more readily melted therefrom than where the coating is of uniform thickness upon the fastening member, since in the latter case the melted alloy tends to stick within the recess between the fastening member and the material of the handle. The enlarged space thus provided between the fastening member and the material of the handle after the alloy is removed therefrom may also be utilized to permit a limited movement of the fastening member with respect to the handle, and thus afford adjustment of the handle with respect to the article to which it is attached. The last mentioned feature is also illustrated in Fig. 7, which shows a fastening member 41 embedded in a handle 42, the alloy for spacing the fastening member from the molded material of the handle having been removed. Fastening member 41 is provided in this instance with a spherical head portion 43 which in conjunction with the tapered passage 44 permits adjustment of the fastening member with respect to the handle, as shown in dotted lines, or vice versa.

What I claim as new and desire to secure by Letters Patent is:—

1. A molded plastic composition article having molded therein an attaching member which is freely rotatable with respect thereto.

2. A molded plastic composition article having an attaching member molded therein said member having clearance from the surrounding molded material to permit of its free rotation with respect to the article and having a retaining shoulder to cooperate with a shoulder formed within the article.

3. A molded handle having a headed member molded in and projecting therefrom, said member being freely rotatable with respect to said handle and having the projecting portion thereof screw-threaded and provided with a wrench to be clamped between the handle and the article to which it is attached.

4. A molded handle having spaced attaching members molded therein and projecting therefrom, said members having clearance from the material molded thereabout to permit of their free rotation and a limited variation of the distance between centers thereof and said projecting portions of said members being screw threaded and provided with wrenches to be clamped between the handle and the article to which the handle is attached.

5. The combination with an article having a threaded handle socket, of a molded handle having molded therein a headed member which is freely rotatable and provided with a threaded projecting portion and a wrench mounted on the projecting threaded portion of said member to thread the latter into the socket of said article and to be clamped between said article and the handle.

6. A molded handle of substantially U-shape having attaching members molded in the arms thereof and extending throughout a major portion of the length of said arms, said members having clearance from the surrounding molded material to permit of their free rotation and having screw threaded portions projecting from the handle and provided with flat faces and wrenches mounted on said projecting portions of said members and engaging the flat faces thereof to screw the same into the article to which said handle is to be attached.

7. The method of forming a molded plastic composition article provided with a rotatable insert which comprises coating the insert with a low melting point alloy, molding the article around such coated insert and then melting such coating.

8. The method of molding a plastic composition article provided with a rotatable insert which comprises surrounding the insert with a low melting point alloy to provide therefor a coating which varies in thickness and having its maximum thickness adjacent an outer face of the article, molding the article about said insert and then melting and removing such coating.

9. The method of forming a molded plastic composition handle provided with a spherically headed attaching member molded therein which comprises coating the spherical head and a portion of the body of said member with a low melting point alloy to provide a coating which increases in thickness from the head of said member toward the outer extremity thereof, molding the handle around such coated portions of said member and then melting and removing said coating.

10. A molded plastic composition handle having a headed attaching member embedded and anchored therein by the molding operation, said attaching member having a coating of low melting point alloy to permit relative movement of the attaching member with respect to the handle upon application of heat.

11. An insert for a molded plastic composition article comprising a headed member having a coating of fusible material about which the article is adapted to be molded, said coating being adapted when heated to permit relative rotation of the member within the article.

In witness whereof, I have hereunto subscribed my name.

JOHN B. SANBORN.